US005328148A

United States Patent [19]

Hartmut

[11] Patent Number: 5,328,148

[45] Date of Patent: Jul. 12, 1994

[54] CONTROL DEVICE FOR HYDRAULIC PISTON/CYLINDER UNIT

[75] Inventor: Sandau Hartmut, Schwieberdingen, Fed. Rep. of Germany

[73] Assignee: Robert Bosch GmbH, Stuttgart, Fed. Rep. of Germany

[21] Appl. No.: 971,751

[22] PCT Filed: Sep. 21, 1991

[86] PCT No.: PCT/DE91/00748

§ 371 Date: Jan. 26, 1993

§ 102(e) Date: Jan. 26, 1993

[87] PCT Pub. No.: WO92/07194

PCT Pub. Date: Apr. 30, 1992

[30] Foreign Application Priority Data

Oct. 10, 1990 [DE] Fed. Rep. of Germany ....... 4032078

[51] Int. Cl.[5] .......................................... F16K 31/363

[52] U.S. Cl. .............................. 251/30.04; 251/30.05; 251/38

[58] Field of Search ...................... 251/30.04, 30.05, 38

[56] References Cited

U.S. PATENT DOCUMENTS 2,694,544 11/1954 Hall .................................. 251/38 X
3,033,228 5/1962 Mohler ......................... 251/30.04 X
3,667,722 6/1972 Katz et al. ........................ 251/30.04
4,746,093 5/1988 Scanderbeg ...................... 251/30.04

FOREIGN PATENT DOCUMENTS 3042277 6/1982 Fed. Rep. of Germany .
3429218 2/1986 Fed. Rep. of Germany .
875402 8/1961 United Kingdom .

*Primary Examiner*—Gerald A. Michalsky
*Attorney, Agent, or Firm*—Michael J. Striker

[57] ABSTRACT

A control device for a hydraulic work cylinder has a housing having an inlet, an outlet, and a valve seat, a shut-off valve having a valve body cooperating with the valve seat of the housing and having a further valve seat, a pilot valve member arranged in the valve body and cooperating with the further valve seat of the valve body under the action of a spring force. The housing and the valve body form therebetween a pressure chamber so that the valve body under the action of a pressure in the pressure chamber is pressed against the valve seat of the housing. The pilot valve member has a valve member part and a plurality of pilot portions arranged in series. Two throttles are arranged in series so that the pressure chamber communicates with the supply of the housing through the throttles and the pilot valve member is located between the throttles. The pressure chamber is connected with the outlet of the housing through the pilot valve member and a passage which opens by the pilot valve member.

9 Claims, 3 Drawing Sheets

CONTROL DEVICE FOR HYDRAULIC PISTON/CYLINDER UNIT

BACKGROUND OF THE INVENTION

The present invention relates to a control device for a hydraulic piston/cylinder unit.

More particularly, it relates to a control device which has a shut-off valve with a valve body cooperating with a valve seat, and a pilot valve member arranged in the valve body and abutting against a valve seat under the action of a spring to control the pressure in a pressure space formed between the valve body and the valve housing.

Such a control device is already known from DE-OS 30 42 277. In this control device it is brought about with the aid of a fine-control shut-off valve—a so-called lowering brake valve—that the load acting on a consumer, for instance, does not proceed in advance of the pressure medium flow associated with the consumer when the load decreases. This shut-off valve has a control valve member which is guided in its valve slide. A control pin of this control valve member projects into an outlet bore hole. Such a shut-off valve has the disadvantage that pressure medium can only flow off when the control pin emerges from the outlet bore hole. The actuating path along which an adjusting device must move the shut-off valve before pressure medium can flow at all is very long.

SUMMARY OF THE INVENTION

Accordingly, it is an object of the present invention to provide a control device for a hydraulic piston/cylinder unit, which avoids the disadvantages of the prior art.

In keeping with these objects and with others which will become apparent hereinafter, one feature of the present invention resides, briefly stated, in a control device for a hydraulic piston/cylinder unit, in which a pilot slide has a valve member and a plurality of pilot portions arranged in series, the pressure chamber is connected with the supply by two throttles arranged in series, and the pressure chamber is connectable with the discharge through the pilot slide located between the throttles and also through a passage which is opening by the pilot slide.

When the control device is designed in accordance with the present invention, it has the advantage over the prior art that the actuating paths for the shut-off valve are very short and the required actuating forces are small so that proportional magnets in particular can be used as an adjusting device for a fine control of the pressure medium flow. This is achieved by the shaping of the valve body and the construction of the pre-control or pilot slide. In particular this enables a continuous, finely controllable outflow of the pressure medium. Moreover, a stable curve of the valve characteristic over a large range is achieved as a result of the cooperation between the pilot slide and the throttle holes in the valve body. This high regulating stability of the valve results in operation with reduced vibrations so that rattling and whistling noises are also reduced. The device according to the invention is particularly suitable as a so-called lowering brake valve in which the pressure medium flowing back from the consumer (hydraulic cylinder) is throttled so that no advancing of the load or "jerking" occurs as was mentioned in the beginning.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
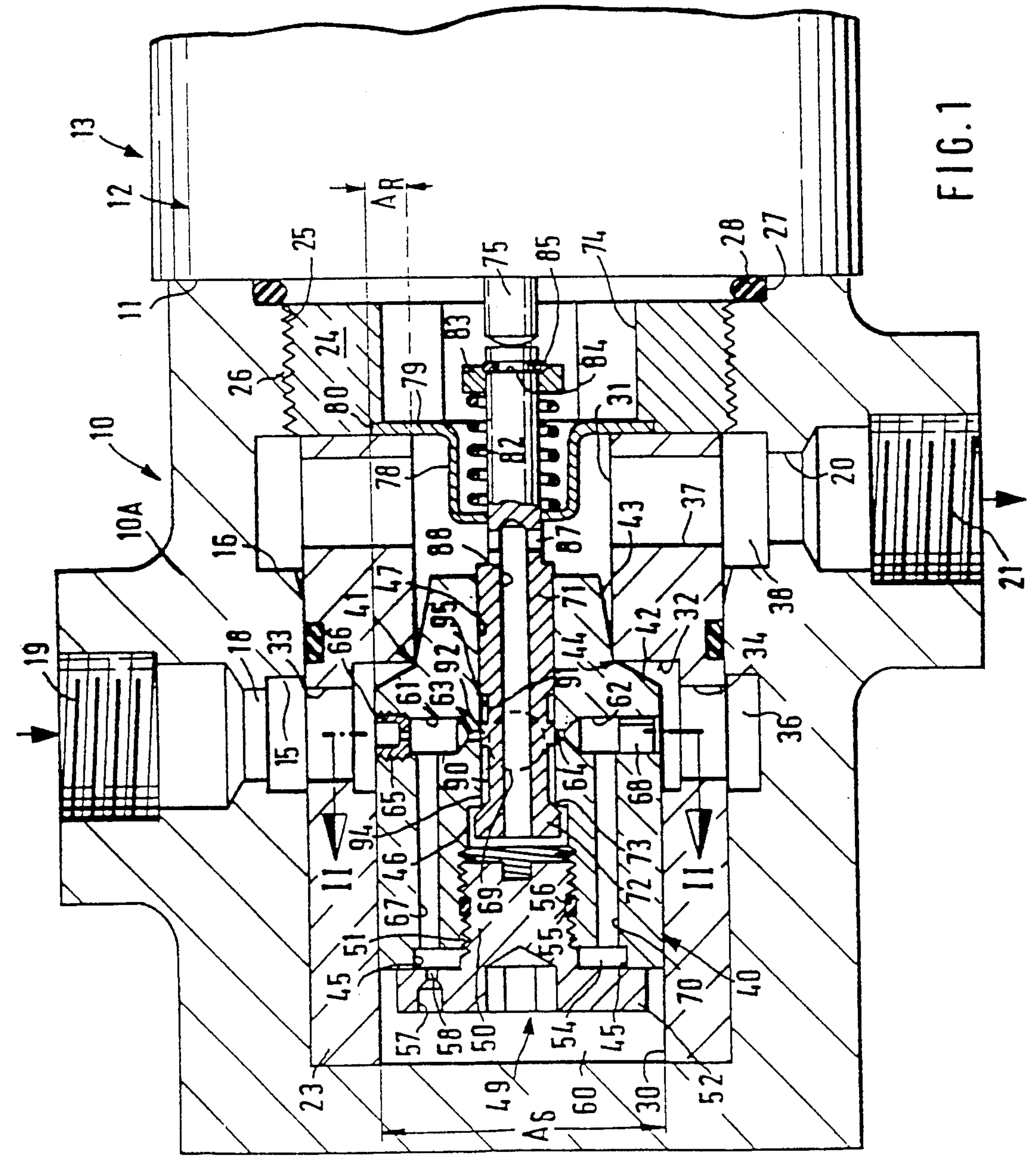
FIG. 1 shows a longitudinal section through a shut-off valve in a somewhat simplified view.

In FIG. 1 an approximately pot-shaped valve housing of a shut-off valve 10 is designated by 10A. The open end 11 of the valve housing 10A contacts a housing 12 of a proportional magnet 13. Two circumferentially extending annular grooves 15, 16 are constructed in the interior of the valve housing. The annular groove 15 communicates with a pressure medium source via a bore hole 18 and a connection 19 for supplying pressure medium, and the annular groove 16 is connected, via a bore hole 20, with a connection 21 which leads to a consumer and guides off pressure medium.

A cylindrical bushing 23 is inserted in the valve housing 10 and fixed in the housing by a locking nut 24 having an external thread 25. For this purpose the valve housing has a corresponding internal thread 26 in the region of its end side 11. The internal thread 26 proceeds from a cylindrical recess 27 at the end side, a sealing ring 28 being inserted in this cylindrical recess 27. The connection of the valve housing to the proportional magnet is sealed externally by this seal. Two bore holes 30, 31 which merge into one another extend axially through the bushing 23, the bore hole 31 facing the end side 11 having the smaller diameter. An annular groove 32 is constructed in the wall of the bore hole 30 in the region of the transition to the bore hole 31 and communicates via transverse bore holes 33, 34 with an annular conduit 36 formed by the annular groove 15 and the bushing 23. The bore hole 31 is penetrated by a transverse bore hole 37 constructed in the bushing 23. The transverse bore hole 37 connects the bore hole 31 with an annular conduit 38 formed by the annular groove 16 and the bushing 23.

A valve body 40 is guided in the bore hole 30 of the bushing 23 in a tightly sliding manner. This valve body 40 cooperates with a valve seat 41 constructed at the transition of the bore hole 30 into bore hole 31. In the region of the valve seat 41 the valve body 40 is constructed as a flat cone 42 which passes into a fine-control cone 43. The transition 44 from the cone to the fine-control cone does not have the form of an edge, but rather is constructed as a concave rounded portion.

The valve body 40 is penetrated by three coaxially extending bore holes 45, 46, 47 which pass one into the other. The bore hole 47 opening out at the fine-control cone 43 has the smallest diameter. The bore hole 45 opening out at the opposite end side has the greatest diameter. The valve body is closed at one side by a screw 49 on the end side located opposite the fine-control cone. The threaded portion 50 of the screw projects into the bore hole 46 which has an internal thread on a corresponding portion of its length. The screw head 52 contacts the end side of the valve body so that an annular conduit 54 is formed by the bore hole 45 and the screw 49. An annular groove 55 is constructed in the threaded portion 50 of the screw. A sealing ring 56 which seals the annular conduit 54 relative to the bore hole 46 is inserted in the annular groove 55. A pocket bore hole 57 is arranged in the screw head 52 on the side remote of the valve body. A throttle hole 58 proceeds from the base of the pocket bore hole 57 and opens into the annular conduit 54. The annular conduit 54 communicates with a pressure space 60 formed between the base of the housing 10A and the valve body 40 via the bore holes 57, 58.

Figure 2:
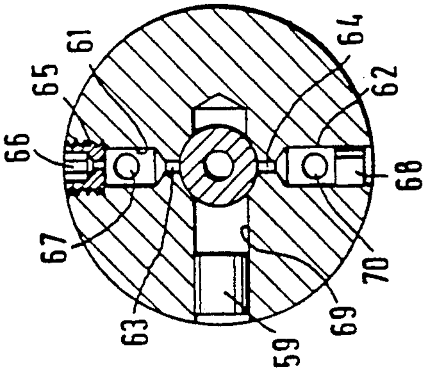
FIG. 2 shows a section along II—II according to FIG. 1.

Two oppositely located pocket bore holes 61, 62 which proceed from the outer circumference and are arranged in the region of the annular groove 32 extend radially in the valve body 40. Throttle holes 63, 64 proceed from the base of the pocket bore holes 61, 62, respectively, and open into the bore hole 47. In the region of the outer circumference of the valve body the bore hole 61 has an internal thread 65 in which a screw-in throttle 66 is inserted. The bore hole 62 is closed in the region of the outer circumference of the valve body by a plug 68. The pocket bore hole 61 is connected with the annular conduit 54 via a longitudinal duct 67 and the pocket bore hole 62 via a longitudinal duct 70. The bore hole 47 is penetrated by a third radially extending pocket bore hole 69 in the region of the openings of the throttle holes 63, 64. The pocket bore hole 69 likewise proceeds from the outer circumference of the valve body and is closed in this location by a plug 59 (see FIG. 2).

A pilot slide 71 is guided in the bore hole 47 in a tightly sliding manner. It projects into the bore hole 46 on one side with a conically widened valve cone 72 and cooperates in this location with a valve seat 73 constructed at the transition of bore hole 46 into bore hole 47. On the other side, the pilot slide projects into a hexagonal opening 74 of the locking nut 24 and cooperates with an actuating tappet 75 projecting from the proportional magnet 13 into the opening 74. The pilot slide 71 penetrates the base of a pot-shaped spring guide member 78 which projects into the bore hole 31 and contacts the front side of the bushing 23 with a rim-like edge 79. The spring guide member 78 is fixed in position by the locking nut 24. To this end, the latter has an annular groove 80 whose diameter corresponds to that of the collar-shaped edge 79. The spring guide member 78 can also be fixed in the radial direction by the edges of the opening 74; the outer circumference of the edge 79 should then correspond to the inner circular diameter of the hexagonal opening 74. One end of a pressure spring 82 is supported at the inside of the base of the spring guide member 78, its other end contacting a disk 83 which is slipped over the pilot slide 71. A securing ring 85 which is fitted into an annular groove 84 at the end of the pilot slide prevents this disk from slipping off.

The pilot slide 71 is penetrated by a transverse bore hole 87 in the region between the spring guide member 78 and the fine-control cone 43. A longitudinally extending pocket bore hole 88 which proceeds from the pilot valve cone 72 opens into this transverse bore hole. Two annular grooves 90, 91 are constructed at the outer circumference of the pilot slide, a narrow collar 92 remaining between them. This collar 92 closes the throttle holes 63, 64 when the pilot valve cone 72 contacts the valve seat 73. The annular groove 90 extends from the collar 92 to the valve cone 72 which proceeds from the base of this groove. Two annular conduits 94, 95 which are connected with one another via the pocket bore hole 69 in every operating position of the pilot slide are formed by the annular grooves 90, 91 together with the wall of the bore hole 47. The diameter of the pocket bore hole 69 is large enough so that the two annular conduits are also connected when the pilot slide lifts.

The shut-off valve 10 is closed when the proportional magnet 13 is not excited. The valve cone 72 of the pilot slide 71 is drawn against its seat 73 and accordingly the valve body 40 is also drawn against its seat 41 by the action of the pressure spring 82. The collar 92 simultaneously closes the throttle holes 63, 64. The pressure medium connection 19 is connected on the inlet side with the screw-in throttle 66 via the bore hole 18, the annular conduit 36 and the bore holes 33, 34 as well as by the annular groove 32. The pressure medium reaches the annular space 54 via the longitudinal duct 67 and arrives in the pressure space 60 via the throttle hole 58 and the bore hole 57. A connection is simultaneously formed from the annular conduit 54 to the bore hole 62 via the longitudinal duct 70. The bore hole 31, which is closed on one side by the valve body, communicates with the pressure medium connection 21 on the outlet side via the bore hole 37, the annular conduit 38 and the bore hole 20. Since the end face $A_S$ of the valve body—corresponding to the surface of the bore hole 30—which is acted upon by pressure medium is greater than the annular surface $A_R$—corresponding to the surface differential between bore holes 30 and 31—the valve body is additionally pressed against its seat 41. The leakage losses in the closed position of the shut-off valve are very low due to the seat valves and the long sliding guidance of the pilot slide 71 in the bore hole 47.

When the proportional magnet 13 is excited the pilot slide 71 is moved to the left by the tappet 75 of the proportional magnet 13 so that the pilot valve cone 72 is lifted from its valve seat 73 and the throttle holes 63, 64 which were previously closed on one side by the collar 92 are opened.

When there is pressure at the pressure medium connection 19, pressure medium flows from the connection bore hole 19 on the inlet side, as described above, to the bore holes 61, 62 and from there via the throttle holes 63, 64 into the annular conduit 95. A connection is formed with the annular conduit 94 via the closed pocket bore hole 69. The pressure medium proceeds from the latter via the opened valve seat 73 to the bore hole 46 which is closed on one side. The bore hole 46 communicates via the longitudinal bore hole 88 and the transverse bore hole 87 in the valve slide 71 with the bore hole 31 which is connected with the pressure medium connection 21 on the outlet side as was already described.

The pressure in the bore hole 61, and accordingly also in the pressure space 60, drops corresponding to the opening of the throttle holes 63, 64 by the collar 92 in relation to the bore hole of the screw-in throttle 66. When the pressure in the pressure space 60 drops to such an extent that the pressure forces on the opposite end side of the valve body (annular surface $A_R$) predominate, the valve body 40 moves to the left. Pressure medium then flows out of the annular groove 32, past the opened valve seat 41, into the bore hole 31 and from there reaches the pressure medium connection 21. When the pilot slide 71 follows the tappet 75 with a corresponding movement to the right due to the action of the spring 82, the valve body 40 likewise follows (sequential or follow-up control). This movement of the valve body results from the changing pressure ratios at the end sides of the valve body and from the mechanical guidance of the pilot slide. The force required to move the pilot slide is determined by the pressure spring 82 and the friction in the bore hole 47. Since the pressure in the annular conduits 94, 95 is balanced by the bore hole 69, no hydraulic forces act on the pilot slide. The actuating forces for the pilot slide are therefore small. If the pressure at the connection 19 is so low that it cannot by itself move the valve cone 40 the pilot slide reinforces the movements. When opening (movement toward the left), the pilot slide 71 strikes against the screw 52 with the end side of the valve cone 72—after the throttle holes 63 and 64 are completely open—and accordingly reinforces the movement toward the left. When closing, the valve body 40 is carried along by the valve cone 72 of the pilot slide.

Figure 3:
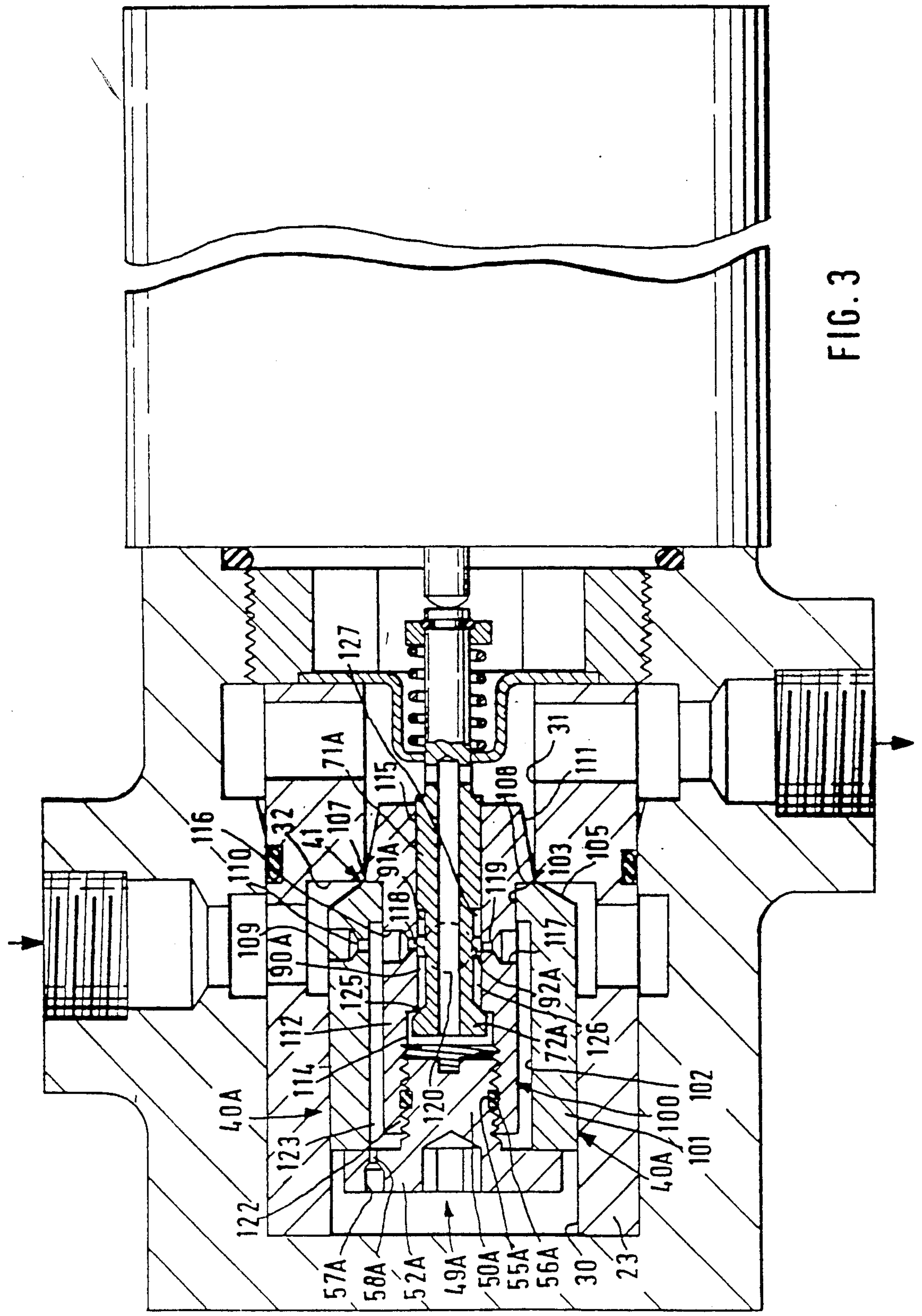
FIGS. 3 and 4 each show a longitudinal section through a modification of the embodiment example.

FIG. 3 shows a modification of the embodiment example according to FIG. 1 in which the valve body is constructed in two parts. Identical parts are provided with the same reference numbers. This embodiment form offers advantages in technical respects relating to manufacture since the cone serving as seat cone and the fine-control cone can be machined separately. The valve body 40A which is guided in the bushing 23 so as to slide in a tight manner includes an inner cylindrical valve body sleeve 100 and an outer cylindrical valve body sleeve 101. The outer diameter of the valve body sleeve 101 corresponds to the diameter of the bore hole 30 in the bushing 23. This valve body sleeve 101 is penetrated axially by two bore holes 102, 103 which pass one into the other coaxially. The bore hole 103 opening out in the region of the valve seat 41 has the smaller diameter. The diameter of this bore hole 103 is smaller than the diameter of the bore hole 31 in the bushing 23. The end side of the valve body sleeve 101 facing the valve seat 41 is constructed as a flat cone 105. This flat cone 105 terminates in the region of the diameter of the bore hole 31, i.e. in the region of the valve seat 41, in a concave rounded transition 107 in such a way that an annular shoulder 108 remains at the end side of the valve body sleeve, the outer diameter of the annular shoulder 108 being somewhat smaller than the diameter of the bore hole 31. A radially extending pocket bore hole 109 which proceeds from the outer circumference is arranged in the valve body sleeve 101, a throttle hole 110 proceeding from its base opens into the bore hole 102. The bore hole 102 and the annular groove 32 are connected with one another via the bore holes 109, 110.

The inner valve body sleeve 100 includes a fine-control cone 111, which projects into the bore hole 31, and a cylindrical portion 112 which projects through the bore hole 103 into the bore hole 102. The outer circumference of the portion 112 corresponds to the diameter of the bore hole 103. The outer diameter of the fine-control cone 111 corresponds to the outer diameter of the annular shoulder 108. The fine-control cone contacts the annular shoulder in a flush manner so that a smooth transition is formed from the cone 105 to the fine-control cone 111 via the concave transition 107.

Two bore holes 114, 115 which pass one into the other extend axially through the inner valve body sleeve 100, the bore hole 115 opening out at the fine-control cone 111 having the smaller diameter. Two radial pocket bore holes 116, 117 which are located opposite one another extend from the outer circumference of portion 112. Throttle holes 118, 119 proceed from the base of the pocket bore holes 116, 117 and open into the bore hole 115. The bore hole 115 is again penetrated in the region where the throttle holes 118, 119 open out by a pocket bore hole 120 which likewise proceeds from the outer circumference of the portion 112 and is closed by a plug, not shown.

The valve body 40A is closed by a screw 49A on one side located opposite the fine-control cone. The threaded portion 50A of the screw projects into the bore hole 114 of the inner valve body sleeve which has an internal thread 122 on a corresponding portion of its length. The screw head 52A contacts the end side of the outer valve body sleeve 101 in such a way that the inner valve body sleeve is braced against the outer valve body sleeve. An annular space 123 defined by the screw is formed between the two valve body sleeves in the region of the bore hole 102 and the portion 112. An annular groove 55A is constructed in the threaded part 50A of the screw. A sealing ring 56A which closes the bore hole 114 tightly on one side is inserted in the annular groove 55A. A pocket bore hole 57A is arranged in the screw head 52A on the side remote of the fine-control cone. A throttle hole 58A which opens into the annular space 123 proceeds from the base of the pocket bore hole 57A.

A pilot slide 71A corresponding to the embodiment example described above is guided in the bore hole 115 so as to slide in a tight manner. It extends into the bore hole 114 with its valve cone 72A and cooperates with a valve seat 125 constructed at the transition between bore holes 114 and 115. The collar 92A at the outer circumference of the pilot slide closes the throttle holes 118, 119 when the valve cone 72A contacts the seat 125. Together with the wall of the bore hole 115, the annular grooves 90A, 91A form two annular conduits 126, 127 which are connected with one another via the pocket bore hole 120 in every work position of the pilot slide.

This shut-off valve operates in a manner analogous to the embodiment example described in the preceding.

Figure 4:
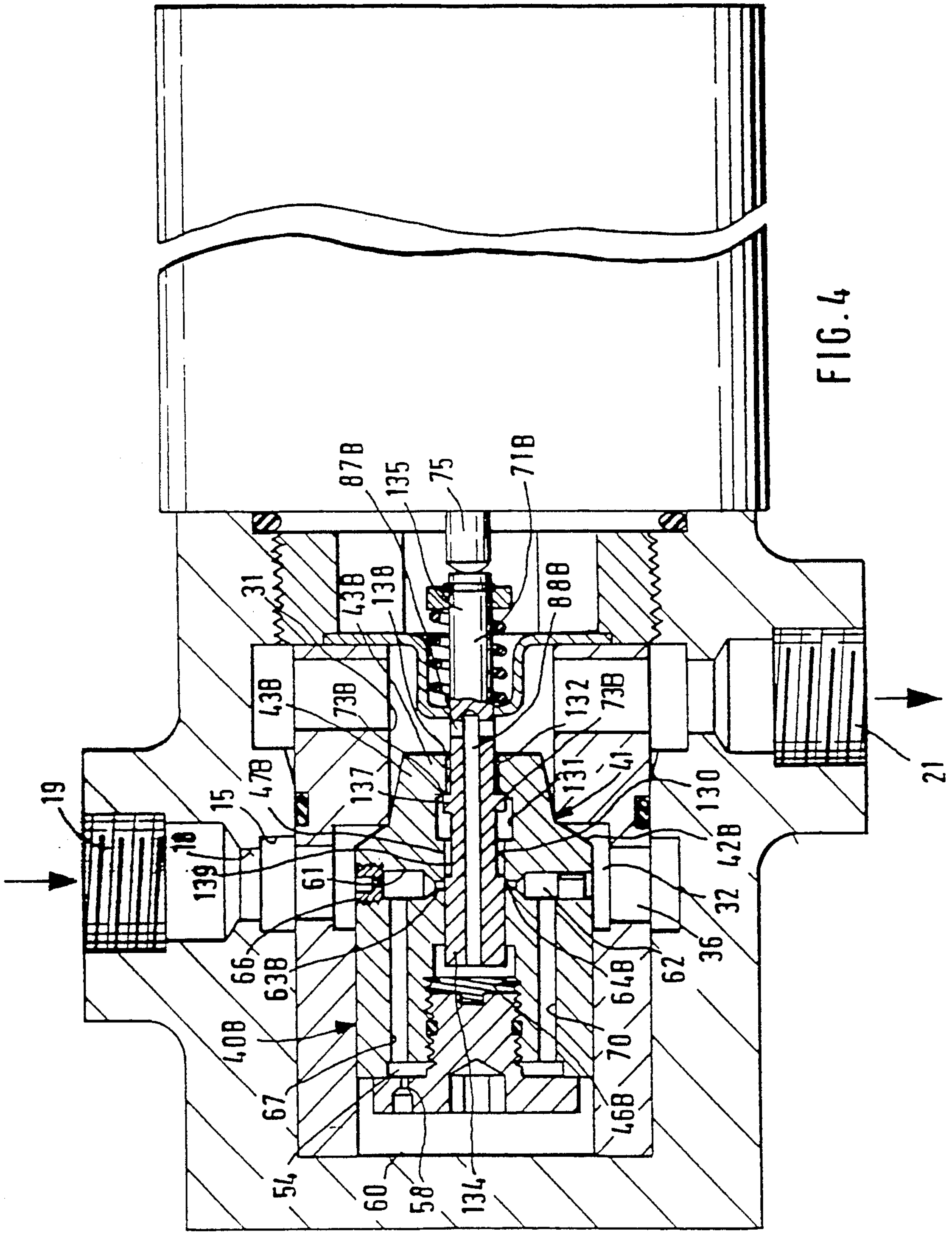

FIG. 4 shows another embodiment example which differs from that described above in the construction of the valve body and pilot slide. Identical parts are provided with the same reference numbers in this instance as well. The valve cone 40B differs from the valve cones 40, 40A in that the valve seat 73B for the pilot slide 71B is relocated. A longitudinal bore hole having three bore hole portions 130, 131, 132 passing axially one into the other proceeds from the bore hole 46B. The bore hole portion 130 proceeding from the bore hole 46B corresponds to the bore hole 47. The bore hole portion 131 which has a greater diameter and merges into the bore hole portion 132 opening out at the fine-control cone is constructed in the region between the throttle holes 63B, 64B and the end side of the fine-control cone 43B. The diameter of the bore hole portion 132 is smaller than that of the bore hole portion 130. The transition between the bore hole portions 131, 132 is constructed as a valve seat 73B.

The pilot slide 71B substantially includes two cylindrical slide portions 134, 135. The portion 136 projects through the fine-control cone until reaching the tappet 75 and cooperates with the latter 75 and with the spring guide device in a manner which has already been described in the preceding. The slide portion 135 has a smaller diameter than that of the bore hole portion 132 so that an annular space 138 remains between the slide portion and the bore hole portion. In the region of the bore hole portion 131 the slide portion 135 has a narrow collar 137 which cooperates with the valve seat 73B. The diameter of this collar is of the same magnitude as that of the bore hole portion 130. The slide portion 135 passes into the slide portion 134 in the region of the throttle hole 63B, 64B. The slide portion 134 is guided in the bore hole portion 130 so as to slide in a tight manner and projects into the bore hole 46B. Another annular space 139 remains between the slide portion 135 and the bore hole portion 130. The slide portion 134 is constructed in such a way that the throttle holes 63B, 64B are closed by it when the collar 137 contacts the valve seat 73B.

A longitudinal bore hole 88B which proceeds from the bore hole 46B and opens into the transverse bore hole 87B is likewise arranged in the pilot slide 71B as in the embodiment forms described above.

When the proportional magnet 13 is not excited the collar 137 contacts the valve seat 73B due to the action of the spring. At the same time, the slide portion 134 closes the throttle holes 63B, 64B. Pressure medium thus reaches the screw-in throttle 66 from the pressure medium connection 19 on the inlet side via the bore hole 18, the annular conduit 36 and the annular groove 32. The pocket bore hole 61 and longitudinal duct 67 form a connection from the latter to the annular space 54 which is in turn connected with the pocket bore hole 62 via the longitudinal duct 70.

A connection is formed from the annular space 54 to the pressure space 60—as described above—via the throttle hole 58. The action of the hydraulic and mechanical forces when the proportional magnet is excited is analogous to that in the embodiment example according to FIG. 1.

When the pilot slide 71B is moved to the left by the tappet 75, the collar 137 is lifted from the valve seat 73B and the throttle holes 63B, 64B which were previously closed on one side by the slide portion 134 are opened. Pressure medium thus reaches the annular space 139 from the pocket bore holes 61, 62 via the throttle holes 63B, 64B and flows past the opened valve seat 73B via the bore hole portion 131 into the annular chamber 138 which leads to the bore hole 31. The latter is connected with the pressure medium connection 21 on the outlet side as described above.

The opening and closing of the valve seat 41 is effected in a manner analogous to the embodiment examples according to FIG. 1.

It will be understood that each of the elements described above, or two or more together, may also find a useful application in other types of constructions differing from the types described above.

While the invention has been illustrated and described as embodied in a control device for hydraulic piston/cylinder unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A control device for a hydraulic work cylinder, comprising a housing having an inlet and an outlet, and a valve seat; a shut-off valve having a valve body cooperating with said valve seat of said housing and having a further valve seat, said valve body having an obtuse-angled cone which passes into a fine-control cone, and a transition provided between said cones and being rounded; a pilot valve member arranged in said valve body and cooperating with said further valve seat of said valve body under the action of a spring force, said housing and said valve body forming therebetween a pressure chamber so that said valve body under the action of a pressure in said pressure chamber is pressed against said valve seat of said housing, said pilot valve member having a valve member part and a plurality of pilot portions arranged in series; two throttles arranged in series so that said pressure chamber communicates with said inlet of said housing through said throttles and said pilot valve member is located between said throttles, said pilot valve member being arranged so that pressure forces acting on said pilot valve member are compensated, said pressure chamber being connected with said outlet of said housing through said pilot valve member and a passage which opens by said pilot valve member.

2. A device as defined in claim 1, wherein said throttles are formed in said valve body of said shut-off valve.

3. A device as defined in claim 1, wherein said valve body of said shut-off valve has pressure medium conduits which connect said throttles with one another.

4. A device as defined in claim 1, wherein said valve body has throttles which are variable by said pilot valve portions and control the pressure in said pressure chamber.

5. A device as defined in claim 1, and further comprising a spring which applies a force to said pilot valve member so as to pull said pilot valve member.

6. A device as defined in claim 1, wherein said pilot valve portions are formed as annular grooves.

7. A device as defined in claim 6, wherein said annular grooves and said valve body form annular conduits, said valve body having a pocket bore hole which connects said annular conduits with one another.

8. A device as defined in claim 1, wherein said valve body is composed of an inner valve body sleeve and an outer valve body sleeve.

9. A device as defined in claim 1, wherein said pilot slide member cooperates with said valve seat of said valve body.

* * * * *